(12) United States Patent
Evans et al.

(10) Patent No.: US 7,739,882 B2
(45) Date of Patent: Jun. 22, 2010

(54) VARIABLE SPEED CONTROL

(75) Inventors: Dave Evans, Tellico Plains, TN (US); Robert L. Weber, Middlebury, IN (US)

(73) Assignee: Dometic, LLC, Elkhart, IN (US)

( * ) Notice: Subject to any disclaimer, the term of this patent is extended or adjusted under 35 U.S.C. 154(b) by 1005 days.

(21) Appl. No.: 11/363,682

(22) Filed: Feb. 28, 2006

(65) Prior Publication Data

US 2007/0199338 A1    Aug. 30, 2007

(51) Int. Cl.
 F25B 41/04    (2006.01)
 F25B 13/00    (2006.01)
 B60H 1/32     (2006.01)
 G05D 23/00    (2006.01)

(52) U.S. Cl. .................. 62/228.4; 62/244; 62/229; 62/160; 62/228.1; 236/51

(58) Field of Classification Search .......... 62/228.1, 62/228.4, 229, 160, 244; 236/51
See application file for complete search history.

(56) References Cited

U.S. PATENT DOCUMENTS

| | | | |
|---|---|---|---|
| 3,315,474 A * | 4/1967 | Farer .......................... 62/3.61 |
| 4,661,914 A | 4/1987 | Mulokey et al. |
| 4,734,628 A | 3/1988 | Bench et al. |
| 4,748,822 A | 6/1988 | Erbs et al. |
| 4,873,649 A | 10/1989 | Grald et al. |
| 5,078,318 A | 1/1992 | Kawai et al. |
| 5,126,642 A | 6/1992 | Shahrodi |
| 5,144,812 A | 9/1992 | Mills, Jr. et al. |
| 5,303,562 A | 4/1994 | Bahel et al. |
| 5,311,748 A | 5/1994 | Bahel et al. |
| 5,322,092 A * | 6/1994 | Howeth et al. .................. 141/3 |
| 5,410,230 A * | 4/1995 | Bessler et al. ............... 318/471 |
| 5,440,895 A | 8/1995 | Bahel et al. |
| 5,533,352 A | 7/1996 | Bahel et al. |
| 5,628,199 A | 5/1997 | Hoglund et al. |
| 5,673,568 A | 10/1997 | Isshiki |
| 5,706,664 A | 1/1998 | Hara |
| 5,730,894 A * | 3/1998 | Minor .......................... 252/67 |
| 5,771,704 A * | 6/1998 | Nakajima et al. .......... 62/228.4 |
| 5,782,101 A | 7/1998 | Dennis |
| 5,960,157 A | 9/1999 | McGraw |
| 6,070,660 A | 6/2000 | Byrnes et al. |
| 6,089,034 A | 7/2000 | Lake et al. |
| 6,116,037 A | 9/2000 | Burnett |

(Continued)

FOREIGN PATENT DOCUMENTS

GB    2289962 A    12/1995

OTHER PUBLICATIONS

International Search Report dated Jun. 13, 2007.

*Primary Examiner*—Thomas E Denion
*Assistant Examiner*—Michael Carton
(74) *Attorney, Agent, or Firm*—Pearne & Gordon LLP

(57) ABSTRACT

A variable speed control system is provided for use with a heat pump heating/cooling system having a variable speed compressor. The control system includes a remote transceiver, a second transceiver to communicate with the first transceiver, and an AC power module to communicate with the second transceiver. The AC power module further includes multiple current limiting devices and multiple temperature sensors and varies the output of the variable speed compressor by comparing the readings from the temperature sensors to a pre-determined temperature setting.

9 Claims, 2 Drawing Sheets

U.S. PATENT DOCUMENTS

| | | |
|---|---|---|
| 6,118,239 A | 9/2000 | Kadah |
| 6,230,506 B1 | 5/2001 | Nishida et al. |
| 6,282,910 B1 | 9/2001 | Helt |
| 6,784,385 B2 * | 8/2004 | Hernandez-Perez ...... 200/50.33 |
| 2002/0170305 A1 | 11/2002 | Nakajima |
| 2004/0129012 A1 * | 7/2004 | Feuerecker .................. 62/278 |
| 2007/0035978 A1 * | 2/2007 | Newman, Jr. ............... 363/148 |

* cited by examiner

VARIABLE SPEED CONTROL

FIELD OF INVENTION

The present invention relates to a heating and cooling system. More specifically, the present invention relates to a variable speed control system for heating and cooling systems in a recreational vehicle (RV).

BACKGROUND OF THE INVENTION

Under low voltage, high load conditions, (Similar to those conditions commonly found in typical RV applications), air conditioning and heat pump systems can cause circuit breakers to trip thereby shutting down the entire electrical circuit until the circuit breaker is manually reset. Further, conventional variable speed control systems having a variable speed compressor arise in applications for heating or cooling buildings where there is an unlimited supply of current to operate the compressor. However, a problem arises in RV applications. In RV applications the total available current is limited thus the user must turn off the heating/cooling system if there is not enough current to operate the compressor. This results in poor heating/cooling efficiency and control. Thus, what is needed is a heating and cooling system having a variable speed compressor for an RV where the incoming current and voltage of the compressor can be monitored and controlled. By monitoring the incoming current and voltage on the electrical circuit, the variable speed control system can control the input to the variable speed compressor, allowing the compressor to vary its output to assure that the incoming power limitations are not exceeded.

BRIEF SUMMARY OF THE INVENTION

In accordance with one aspect of the present invention a variable speed control system for a heat pump for a recreational vehicle is provided comprising, a first transceiver, a second transceiver communicating with the first transceiver, a power module board communicating with the second transceiver, a first current limiting device operatively attached to the power board module, and a variable speed compressor, wherein the control system monitors the incoming current to the compressor and limits the output of the compressor based on the maximum allowable ampacity allowed by the first current limiting device.

In accordance with another aspect of the present invention a method of heating or cooling a recreational vehicle with a heat pump is provided comprising the steps of providing a variable speed control system including, a first transceiver, a second transceiver communicating with the first transceiver, a power module board communicating with the second transceiver, a first current limiting device, a variable speed compressor, a fan, a compressor board module to convert incoming single-phase power to variable frequency and voltage three-phase power communicating with the power board module, and a room temperature sensor to measure the temperature inside the RV, measuring the temperature inside the recreational vehicle, comparing the temperature inside the recreational vehicle with a set point temperature, starting the fan, soft-starting the compressor at a predetermined soft-start frequency, maintaining the compressor at the predetermined soft-start frequency, checking for a demand for an increase in heating or cooling requirements, increasing the frequency of the compressor at a predetermined rate if the demand for an increase in heating or cooling exists, increasing the output speed of the compressor, stopping the increase in frequency of the compressor at a predetermined frequency value, maintaining the frequency at the predetermined frequency value, maintaining the output speed of the compressor at a value corresponding to the predetermined frequency value, determining if the demand is satisfied, monitoring the incoming current to the compressor, and limiting the output of the compressor based on the maximum allowable ampacity allowed by the first current limiting device.

In accordance with yet another aspect of the present invention a method of heating or cooling a recreational vehicle with a heat pump is provided comprising the steps of providing a variable speed control system including, a first transceiver, a second transceiver communicating with the first transceiver, a power module board communicating with the second transceiver, a first current limiting device, a second current limiting device, a variable speed compressor, a fan, a compressor board module to convert incoming single-phase power to variable frequency and voltage three-phase power communicating with the power board module, and a room temperature sensor to measure the temperature inside the RV, measuring the temperature inside the recreational vehicle, comparing the temperature inside the recreational vehicle with a set point temperature, starting the fan, soft-starting the compressor at a predetermined soft-start frequency, maintaining the compressor at the predetermined soft-start frequency, checking for a demand for an increase in heating or cooling requirements, increasing the frequency of the compressor at a predetermined rate if the demand for an increase in heating or cooling exists, increasing the output speed of the compressor, stopping the increase in frequency of the compressor at a predetermined frequency value, maintaining the frequency at the predetermined frequency value, maintaining the output speed of the compressor at a value corresponding to the predetermined frequency value, determining if the demand is satisfied, monitoring the incoming current to the compressor, and limiting the output of the compressor based on the maximum allowable ampacity allowed by the second current limiting device.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

Additional benefits and advantages of the present invention will become apparent to those skilled in the art to which it pertains upon a reading and understanding of the following detailed specification.

DETAILED DESCRIPTION OF THE OF THE INVENTION

Any values (i.e. temperature, frequency, time, rate of change, etc.) used in the following description are for illustrative purposes only and are not intended to limit the scope of the invention.

Figure 1:
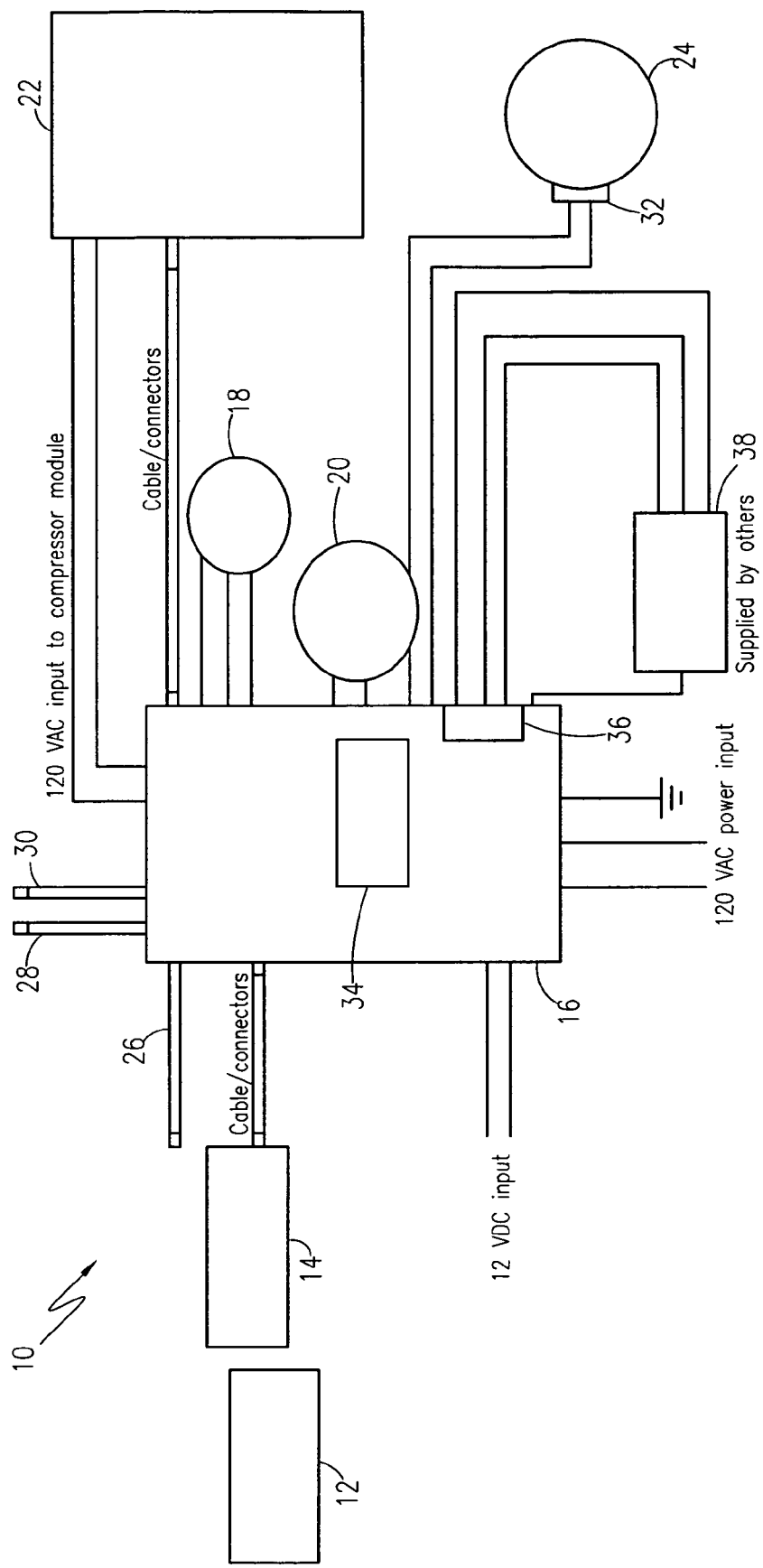
FIG. 1 is a schematic block diagram of a control system according to the present invention.
Figure 2A:
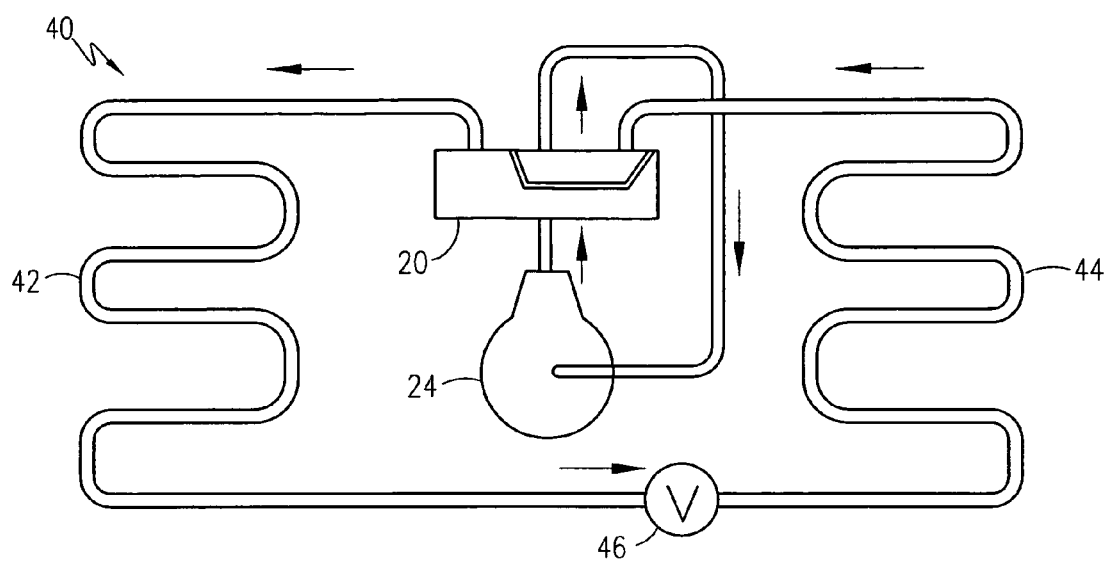
FIGS. 2a and 2b are simplified schematics of a heat pump system in the heating mode and cooling mode respectively.
Figure 2B:
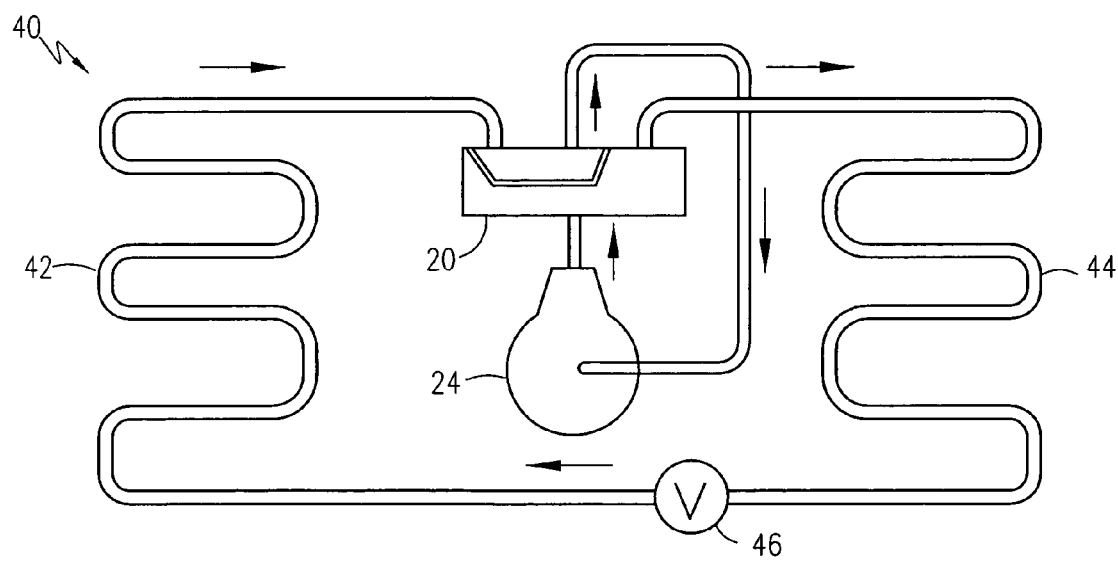

Referring now to the drawings, FIG. 1 shows a schematic of a multi-zone variable speed control system 10 (hereinafter "control system") according to the present invention. The control system 10 may include multiple modes of operation. The mode of operation depends on the type of heating/cooling system being used with the control system 10. Some examples of the types of heating/cooling systems include, but are not limited to, a heat pump, a heat strip, or a furnace. Multiple heating/cooling systems can be controlled with a single control system 10. The control system 10 shown in FIG. 1 is a control system specifically for heat pump 40 applications and will be used in this specification for illustrative purposes only and is not intended to limit the scope of the application. The heat pump 40 heating/cooling system is known in the art and thus the basic operation of the heat pump 40 will not be explained. The basic components of the heat pump 40 are shown in FIGS. 2a and 2b and are as follows: indoor coil 42, outdoor coil 44, expansion device 46, reversing valve 20, and compressor 24.

Referring now to FIG. 1, the control system 10 is powered by an AC power source and a DC power source. The AC power source is required for operating components of the heating/cooling systems such as, for example, a fan, a reversing valve, a compressor module, a compressor, etc. The AC power source may be supplied from an electrical utility, an inverter or a generator. The DC power source controls the operation of the relays and is supplied from the RV DC battery. Both the AC and DC power sources are connected to a variable speed AC power module board 16.

The control system 10 comprises two transmitting/receiving devices 12, 14 and the variable speed AC power module board 16. The first transmitting/receiving device 12 may be a transmitter or a transceiver. The second transmitting/receiving device 14 may be a receiver or a transceiver. The term transceiver will be used throughout the specification for illustrative purposes only and is not intended to limit the scope of the invention. The first and second transceivers 12, 14 may be any type of transceiver known in the art. The first transceiver 12 is a user controlled remote transceiver 12 that provides two-way communication with the second transceiver 14. The two-way communication between the first and second transceiver may be any type of communication known in the art such as but not limited to radio frequency (RF), Infra-red (IR), hard-wired, etc. The user uses the first transceiver 12 to provide input data to the second transceiver 14 in order to control the heating/cooling system. The first transceiver 12 can also include a display to provide the user with information regarding the heating/cooling system such as the temperature inside the RV, the setting of the thermostat, etc. The second transceiver 14 is connected to the AC power module board 16 and in addition to communicating with the first transceiver 12 provides two-way communication to and from the AC power module board 16. The second transceiver 14 may be connected to the AC power module board 16 by any means known in the art such as for example with RJ-11 type connectors.

The AC power module board 16 comprises multiple relays and control circuitry to control a multiple speed fan 18, a reversing valve 20, a compressor module 22 and a compressor 24. The multiple speed fan 18 may be any fan known in the art and may include a manual and/or an automatic mode. Each mode may consist of multiple speeds such as, but not limited to, low, medium, and high. When the multiple speed fan 18 is in the manual mode the fan runs continuously at the indicated speed. When the multiple speed fan 18 is in the automatic mode the fan cycles on and off as the compressor 24 cycles on and off.

The compressor module 22 is powered by the AC power source via the AC power module board 16. The compressor module 22 converts the incoming single-phase power to variable voltage and frequency three-phase power and supplies power to the compressor 24. The compressor module 22 may be a separate board as schematically illustrated in FIG. 1 or it may be integrated as part of the AC power module board 16.

One advantage of a variable speed control system is soft-starting the compressor 24 to thereby reduce or eliminate electrical and mechanical stresses on the compressor 24. Soft-starting refers to initially rotating the motor of the compressor 24 at a slow speed then slowly increasing the rotation of the motor upon demand, as described below. The soft-start limits the starting current thereby reducing electrical stresses on the compressor 24. The frequency of the compressor 24 of the heat pump 40 typically ranges from 20 to 90 Hz. During start up of the heat pump 40 the compressor 24 soft-starts at a frequency of 20 Hz. It should be noted that the compressor 24 can start at any frequency in accordance with the present invention. Located on the exterior of the compressor 24 is a thermal overload sensor 32 that senses the temperature of the compressor casing. The thermal overload sensor 32 is connected to the AC power module board 16. During operation if the temperature of the casing exceeds a predetermined temperature the AC power module board 16 will stop the compressor 24.

Multiple sensors may be connected to the AC power module board 16 to monitor the temperature of the space inside the RV, the temperature outside the RV, etc. These sensors include but are not limited to a room temperature sensor 26, an outdoor temperature sensor 28, and a freeze control sensor 30. The freeze control sensor 30 measures the temperature of the indoor coil 42 in the heat pump 40 during the cooling mode. When the temperature of the indoor coil 42 drops below a pre-determined temperature, for example 27 degrees F., the multiple speed fan 18 operates at high speed and the compressor 24 is de-energized for a predetermined time period. When the temperature of the indoor coil 42 increases to a predetermined temperature, for example 55 degrees F. or greater, the multiple speed fan 18 operates in its programmed speed and the compressor 24 is re-energized.

The AC power module board 16 may include a first current limiting device 34 that identifies the maximum ampacity of the electrical circuit that supplies power to the heating/cooling unit. Thus, the first current limiting device 34 identifies the maximum allowable current available that the control system 10 can deliver to the heating/cooling unit. The first current limiting device 34 may be located on the AC power module board 16 as shown in FIG. 1 and may be any device known in the art such as dipswitches, contacts, etc. In the embodiment shown in FIG. 1 the first current limiting device 34 is comprised of multiple dipswitches. The dipswitches can be set to limit the maximum ampacity to any value such as 15, 20, 25 amps, etc. For example, the 25 amp dipswitch corresponds to a 25 amp circuit breaker. Thus, during initiation of the heating/cooling system the control system 10 determines the maximum allowable ampacity of the circuit by the position of the dipswitches.

The AC power module board 16 may also include a second current limiting device 36 to further limit the maximum available ampacity that the control system 10 can supply to the heating/cooling unit. This second current limiting device 36 may be included on the AC power module board 16 and may be connected to many types of automatic energy management systems for the RV, or may be manually selected at the time when the RV power connection is made. The second current limiting device 36 may be any device known in the art such as, electrical contacts. The second limiting device may be used in the following manner. The AC power source may be an electrical hook-up, such as for example an electrical hook-up at an older campsite. The amount of amps supplied by the electrical hook-up at a campsite can be limited. Thus, energy management is critical to make sure all the systems in the RV have sufficient amps to operate. To facilitate energy management the electrical hookup at the campsite may also include a selector switch 38 (or energy management contacts) that allows a user to switch between multiple amp circuits (i.e. 15, 20, 25 amps etc.). The second current limiting device 36 reads the selector switch 38 position and limits the amps accordingly supplied to the control system 10. For example, if the maximum available amperage at the campsite is 30 and the user positions the selector switch 38 to 15 amps, the second limiting device 36 will read the selector switch 38 position and will limit the amount of amps available to the control system 10 to 15 amps. The remaining 15 amps can then be distributed to the other systems in the RV. Thus, operation of the second current limiting device 36 functions as a means to manage or distribute the available current to all systems in the RV.

Varying the input (i.e. current and voltage) and consequently the output (speed) of the compressor 24, the compressor 24 can be protected from experiencing rapidly changing conditions due to an increase or decrease in heating/cooling requirements. For example, the control system 10 can control the compressor 24 in the following manner. After the system is operating and the compressor 24 is operating at its soft-start frequency then when a demand for an increase heating or cooling capacity is required, the control system 10 will increase the frequency of the compressor 24 at a predetermined rate, for example, 6 Hz/second, to a predetermined frequency value that is less than the maximum frequency of the compressor 24, for example 55 Hz. The increase in frequency increases the output (speed) of the compressor 24 to a speed corresponding to the predetermined frequency value. The control system 10 will maintain that predetermined frequency value for a set period of time to determine if the demand for an increase in heating/cooling is satisfied. If the demand is satisfied the frequency of the compressor 24 will remain unchanged until another demand for an increase or decrease heating/cooling is required. If the demand is not satisfied the control system 10 will continue to increase the frequency of the compressor 24, thereby increasing the output (speed) of the compressor 24, at the predetermined rate until the maximum ampacity of the control system 10 or the maximum frequency of the compressor 24 is reached. The compressor 24 will remain at this frequency until a demand for a decrease in heating/cooling is required. During the above operation the control system 10 monitors the input current to the compressor 24 and prevents the compressor 24 from exceeding the maximum allowable ampacity of the control system 10 as described above. Thus, by limiting the input current to the compressor 24 the heating/cooling system will continue to operate and the user will not be forced to turn off the heating/cooling system due to incoming current limitations as in conventional RV heating/cooling systems.

Conversely, when a decrease in heating or cooling capacity is required the control system 10 will ramp down the frequency of the compressor 24 at a predetermined rate, for example 6 Hz/second, thereby decreasing the output (speed) of the compressor 24, to a predetermined frequency value that is greater than the minimum frequency of the compressor 24, for example 45 Hz, in the same manner as explained above. If the demand is satisfied the frequency and the output (speed) of the compressor 24 will remain unchanged until another demand for an increase or decrease heating/cooling is required. If the demand is not satisfied the control system 10 will continue to ramp down the frequency of the compressor 24 at the predetermined rate until the maximum ampacity of the control system 10 or the minimum frequency of the compressor 24 is reached. It should be noted that the increase frequency rate and the decrease frequency rate may be the same or may be different values.

The heat pump 40 has two modes of operation, a cooling mode and a heating mode. During operation in either mode the control system 10 controls the on and off cycle and the output (speed) of the compressor 24 by comparing the measured temperature of the room as sensed by the room temperature sensor 26 and a set point temperature as entered by the user. The cooling mode is initiated when the control system 10 senses that the room temperature is above the set point temperature. Thus, in the cooling mode, when the room temperature sensor 26 detects a room temperature above the set point temperature by at least 1 degree F., the reversing valve 20 is de-energized, the multiple speed fan 18 turns on and then after a time delay the compressor 24 starts up at the soft-start frequency as explained above. Conversely, in the cooling mode, when the room temperature sensor 26 detects a room temperature below the set point temperature by at least 1 degree F., the compressor 24 turns off then after a time delay the multiple speed fan 18 turns off. During operation under these conditions the frequency of the compressor 24 will remain at the soft-start frequency. However, as explained above, when there is a demand for an increase in cooling the control system 10 will increase the frequency of the compressor 24 to satisfy the demand. A demand for an increase in cooling may occur when the room temperature sensor 26 detects a room temperature above the set point temperature by more than 1 degree F.

The heating mode operates in a similar manner to the cooling mode. When the room temperature drops below a set point temperature entered by the user by at least 1 degree F. the compressor 24 will turn on and the when the room temperature is greater than the set point temperature by at least 1 degree F. the compressor 24 will turn off. In addition, the frequency of the compressor 24 will ramp up and down in a similar manner to that in the cooling mode when a demand for an increase or decrease in heating output is required. In the heating mode the reversing value 20 is energized. A demand for an increase in heating may occur when the room temperature sensor 26 detects a room temperature below the set point temperature by more than 1 degree F.

In the present invention described above a heat pump heating/cooling system can be operated such that the output of the heat pump compressor can be varied as the needs for heating/cooling change. This type of control reduces or eliminates the electrical and mechanical stresses on the compressor therefore prolonging the life of the compressor. In addition, variable speed control prevents unnecessary tripping of breakers due to abrupt changes to the compressor.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

What is claimed is:

1. A variable speed control system for a heat pump, wherein the heat pump is mounted to a recreational vehicle, the variable speed control system comprising:
   a first transceiver;
   a second transceiver communicating with the first transceiver;
   a power module board communicating with the second transceiver, and receiving AC power from a power source external to the recreational vehicle;

a first current limiting device operatively attached to the power module board;

a second current limiting device operatively attached to the power module board, and receiving an input from a circuit amps selector that is external to the recreational vehicle and that is associated with the power source external to the recreational vehicle and that provides a selected ampacity from a plurality of ampacities as the input; and, a variable speed compressor;

wherein the first current limiting device identifies the maximum allowable current available that the control system can deliver to the heat pump, and, wherein the second current limiting device reads the selected ampacity from the input and further limits the current that the control system can deliver to the heat pump according to the input from the circuit amps selector that is external to the recreational vehicle and that is associated with the power source external to the recreational vehicle.

2. The variable speed control system of claim 1, wherein operation of the second current limiting device allows the available current to be distributed to other systems in the recreational vehicle.

3. The variable speed control system of claim 2, wherein the first current limiting device is comprised of dipswitches.

4. The variable speed control system of claim 1, wherein the power module board increases the frequency of the compressor at a predetermined rate when an increase for heating or cooling is required thereby increasing the output of the compressor.

5. The variable speed control system of claim 1, wherein the power module board decreases the frequency of the compressor at a predetermined rate when a decrease for heating or cooling is required thereby decreasing the output of the compressor.

6. The variable speed control system of claim 1 further comprising a compressor module board to convert incoming single-phase power to variable frequency and voltage three-phase power, wherein the compressor module board communicates with the power module board.

7. The variable speed control system of claim 6, wherein the compressor module board is an integrated portion of the power module board.

8. The variable speed control system of claim 7 further comprising:

a fan;

a room temperature sensor to measure the temperature inside the recreational vehicle;

an outdoor temperature sensor to measure the temperature outside the recreational vehicle;

a freeze control sensor to measure the temperature of the indoor coil of the heat pump; and, a thermal overload sensor to measure the temperature of the compressor casing.

9. The variable speed control system of claim 8, wherein the heat pump includes a cooling mode and a heating mode, wherein the cooling mode is initiated when the control system detects that the room temperature sensor senses that the room temperature inside the recreational vehicle is greater than a predetermined set point temperature, and, wherein the heating mode is initiated when the control system detects that the room temperature sensor senses that the room temperature inside the recreational vehicle is less than a predetermined set point temperature.

* * * * *